United States Patent [19]

Van Hoogstrate et al.

[11] Patent Number: 4,964,718
[45] Date of Patent: Oct. 23, 1990

[54] OPTICAL CORRECTOR

[75] Inventors: John A. Van Hoogstrate, St. Peters, Mo.; Richard A. Buchroeder, Tucson, Ariz.

[73] Assignee: McDonnell Douglas Corporation, St. Louis, Mo.

[21] Appl. No.: 393,237

[22] Filed: Aug. 14, 1989

[51] Int. Cl.$^5$ .............................................. G02B 26/08
[52] U.S. Cl. ...................................... 353/31; 353/122; 350/311; 350/437
[58] Field of Search .................... 350/311–313, 350/317, 314, 438, 437, 440, 439; 358/60–61, 104, 10, 230, 231; 353/12, 11, 84, 31, 30; 340/702, 701

[56] References Cited

U.S. PATENT DOCUMENTS

| | | | |
|---|---|---|---|
| 2,717,918 | 9/1955 | Anderson | 358/60 |
| 3,331,277 | 7/1967 | Wehde | 350/437 |
| 3,843,235 | 10/1974 | Mino et al. | 350/314 |
| 4,327,972 | 5/1982 | Brousting | 350/437 |
| 4,454,535 | 6/1984 | Machida | 358/60 |
| 4,698,687 | 10/1987 | Levin | 358/230 |
| 4,755,032 | 7/1988 | True | 358/62 |
| 4,779,024 | 10/1988 | Roussin | 358/62 |
| 4,814,866 | 3/1989 | Dillard et al. | 358/60 |

Primary Examiner—William A. Cuchlinski, Jr.
Assistant Examiner—William C. Dowling
Attorney, Agent, or Firm—Benjamin Hudson, Jr.; George W. Finch; Timothy H. Courson

[57] ABSTRACT

An optical projection system is provided wherein a light valve supplies an aperture consisting of spatially separate colors for projection by a plurality of projection lenses to a projection plane. A color correction lens is placed at a selective pupil of the projection system wherein microscopic amounts of selective power are applied to at least one of the spatially seperated colors of the image at the selected pupil to cause a shift of the wavelength to bring all the wavelengths of the spatially separate colors to a common focus.

14 Claims, 4 Drawing Sheets

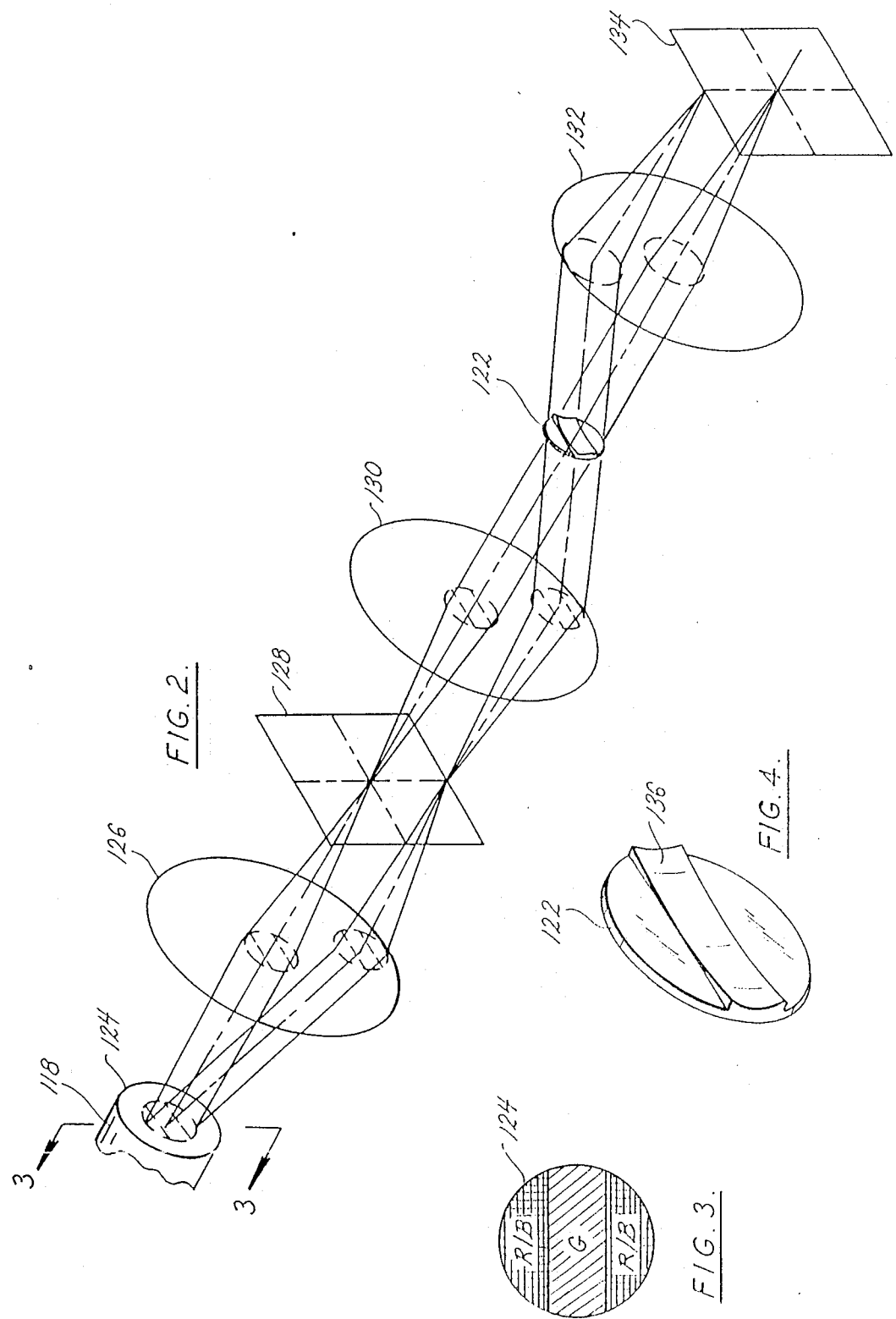

OPTICAL CORRECTOR

BACKGROUND OF THE INVENTION

1. Field of the Invention

This invention relates generally to optical projection systems and more particularly to optical projections systems such as in flight simulators that utilize Schlieren type light valves and have a means to correct for longitudinal chromatic aberration that may be caused by projection of the spatially separated colors generated by the light valve.

2. Brief Description of the Prior Art

In Schlieren type color projection systems, the aperture or pupil of the light valve consists of spatially separated colors that comprise an image. In projection systems such as used in flight simulators wherein the image from the light valve must be relayed through multiple lenses before final projection or focus on a screen or dome, the Schlieren image generated at the pupil of the light valve may be distorted when it is finally focused. This distortion is commonly realized as a longitudinal distortion such that the spatially separated colors of the Schlieren pupil are not focused at a common image plane at the final projection stage. Any one of the spatially separate colors may have a focused image offset from the desired plane. As the image is relayed through multiple lenses in the projection system the distortions increase with each cascaded section.

It is an object of this invention to Provide a simpler, more efficient way to apochromatize the Schlieren image by bringing the wavelengths of the spatially separate colors to a common focus. Another object of this invention is to provide an apparatus for correction of aberrations at any aperture stop in a complex optical train.

SUMMARY OF THE INVENTION

There is provided by this invention an image projection system comprised of a complex optical train for projecting spatially separated colors of the pupil image of a Schlieren type light valve without distortions. A specially shaped correction lens is adapted to be placed at any aperture in the projection system to cause a shift in the wavelength of at least one of the spatially separated colors such that all the colors have a common focus plane. This correction lens obtains color correction at any aperture by applying microscopic amounts of selective power to the image of the selected aperture to cause a shift of the wavelength of at least one of the spatially separated colors to bring all the wavelengths to a common focus.

The foregoing has been a brief description of the principal advantages and features of the present invention. A more thorough understanding thereof may be attained by referring the the drawings and description of the preferred embodiment which follows.

BRIEF DESCRIPTION OF THE DRAWINGS

FIG. 2 is an isometric illustration of an embodiment of the present invention incorporated into an optic system;

FIG. 3 is a front view of the color corrector stripe lens of the present invention identifying its demarked areas with the respective colors served;

FIG. 4 is an isometric view of the color corrector stripe lens of the present invention;

DETAILED DESCRIPTION OF THE PREFERRED EMBODIMENT

Figure 1:
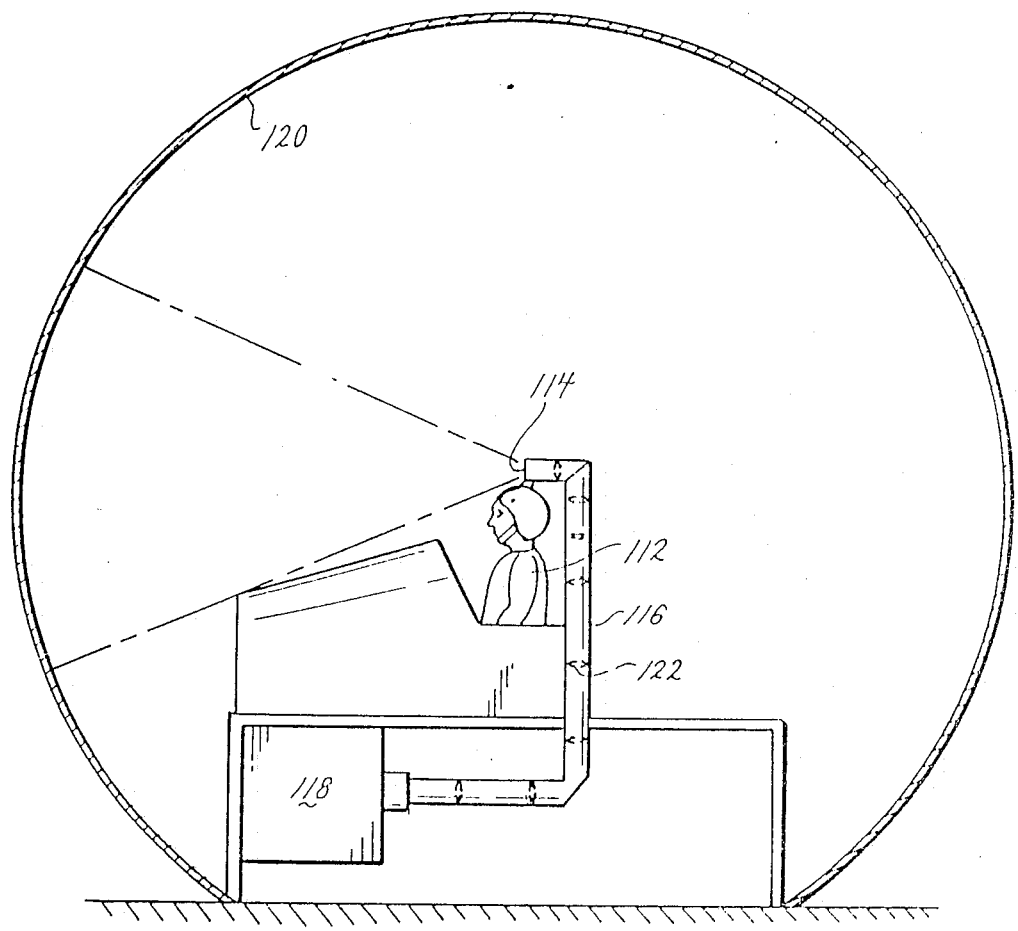
FIG. 1 is a side view of a possible projection system, here a pilot training simulator.

Within optical systems, particularly video projected pilot training simulators, there is a need for high quality projected displays. Referring to FIG. 1, a projection training system 110 is illustrated showing the preferred embodiment incorporating the principles of this invention. In this configuration, a pilot 112 is seated with his eyes adjacent to the aperture 114 of the projection system. Light emanating from the projector's aperture 114 is usually transmitted optically via a network of relay lens extensions 116 from the video source Projector 118 such as a General Electric Light Valve. Light exiting from aperture 114 is projected upon a spherical screen 120. The light valve 118 produces an image that consists of spatially separated colors. When this image is relayed through the lens extensions 116 the image is distorted due to the fact that any one of the colors may be focused in a different image plane than desired. To correct for this distortion a color corrector 122 is placed at an aperture of the optical train. Any one of several physically accessible apertures may be used because they all have the original image of spatially separated colors generated by the light valve 118.

Referring to FIG. 2, an image relaying scheme is illustrated. At the left of FIG. 2, light emanates from aperture 124 of the light valve 118. This light is represented by on-axis and off-axis bundles of light rays. A lens 126, of sufficient diameter, collects and refocuses these light bundles to form two image points at an intermediate image plane 128. This image 128 is formed in air, and the cones of light continue to pass diverging and uninterrupted until collected and refocused by lens 130. The light cones are refocused to a collimated condition. These cylindrical shaped collimated bundles of light cross the central, longitudinal axis of the projection system and continue to diverge until collected by lens 132. The lens 130 relays all the light to the next lens 132. A pupil, inherently formed, is imaged between lenses 130 and 132. This pupil is the image of aperture 124. At this pupil location the color corrector 122 is added. Lens 132 refocuses the collimated bundles of light to form image 134. In a complex optical train there are several apertures in the system as the image of the light valve is relayed to it final projection plane. The color corrector 122 may be placed at any of these pupil locations. The choice location is best determined by physical and mechanical considerations of the design.

The spatial lens configuration of color corrector lens 122 corresponds exactly to the spatial light configuration of pupil 124. It is understood here, however, that the illustration shown in FIG. 2 is symmetric about both the horizontal and vertical axes, and that inversion about both axes as does occur in FIG. 2, does not have to be accounted for by color corrector lens 122, since lens 122 has both horizontal and vertical symmetry. In the case of various spatially segregated light patterns which do not always possess this dual horizontal and vertical symmetry the orientation of lens 122 will be inverted and reverted with respect to the orientation of light leaving pupil 124.

Note that light passing through the pupil area occupied by color corrector lens 122 passes in a color segregated fashion. The middle section of the beam passes through the middle section of color corrector lens 122 while the upper and lower sections of the beam pass through the upper and lower section of color corrector lens 122. Light from color corrector lens 122 continues to the imaging lens 132. As in the case of the first and second relay lenses 126 and 130, the spatial projection of the aperture 124 appears in both its axial and off-axis orientation. This orientation is repeated at image plane 134.

Referring to FIG. 3, a head-on-view of the pupil likeness is illustrated. In this illustration, the top and bottom portions of pupil 124 form upper and lower semicircular areas, and emits red and blue (R/B) light. The mid-section of pupil 124 emits green light.

Referring to FIG. 4, an enlarged isometric view of the color corrector lens 122 illustrates a raised mid-section 136. This thicker and specifically shaped mid-section is dedicated to affecting the green portion of the light beam. The portion of color corrector lens 122 which is not raised can be planar, lens shaped or open depending on the desired treatment of the red/blue portion of the segregated light beam.

Figure 5:
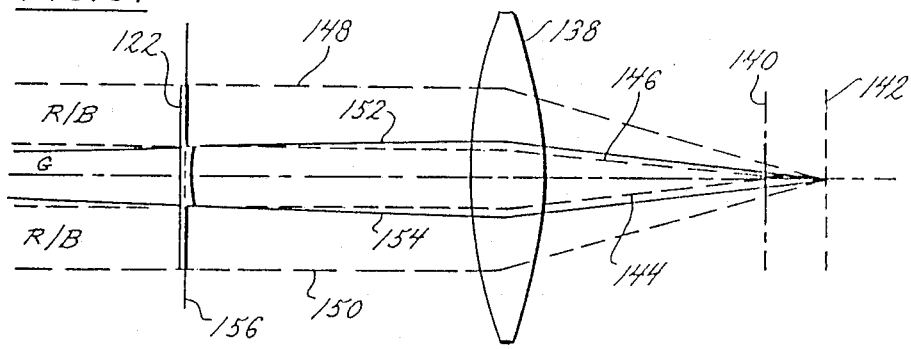
FIG. 5 is an enhanced illustration of how an optical system containing a color segregated pupil reacts with a lens having negative power in the green pupil area, with and without the correction provided by the present invention, illustrating the separate image plane produced for the different colors.

The operation of the color corrector lens 122 in a system using the concave profile color corrector, as was shown in FIGS. 2 and 4, is illustrated with reference to FIG. 5. The imaging system differences without the benefit of the color corrector lens 122 is also shown. An imaging lens 138 images light from the red/blue and the green color segregated origins. Due to the different wavelength frequencies of the red/blue and green light, they will react differently as they pass through the same optical system. A given lens or set of lenses will focus different frequencies of light to different planes. The resulting pair of image planes 140 and 142 are shown. Dashed lines indicated the result without the benefit of color corrector lens 122 of FIG. 2, while the solid lines indicate the result with the benefit of the color corrector lens 122. As shown in FIG. 5, without the color correction lens 122, the dashed lines green rays of light 144 and 146 focus upon first image plane 140, while the dashed red/blue rays of light 148 and 150 focus upon image plane 142. This focal difference will produce a blur in the final image which cannot be removed by changing the distance of the desired image plane between either image plane 140 or 142. Bringing the red/blue image into focus will take the green light image out of focus. A correction of one of the spatial colors within the optic system by using the color corrector 122 brings both spatially separate color beams into the same image plane 142 as shown by the solid lines 152 and 154. The correction lens 122 obtains color correction at the selected aperture 156 by applying microscopic amounts of selective power to the image forming light rays to cause just enough refraction to shift the exiting angle of rays 152 and 154 such that the green wavelength is now focused at the plane 142 in common with the red and blue rays 148 and 150.

Figure 6:
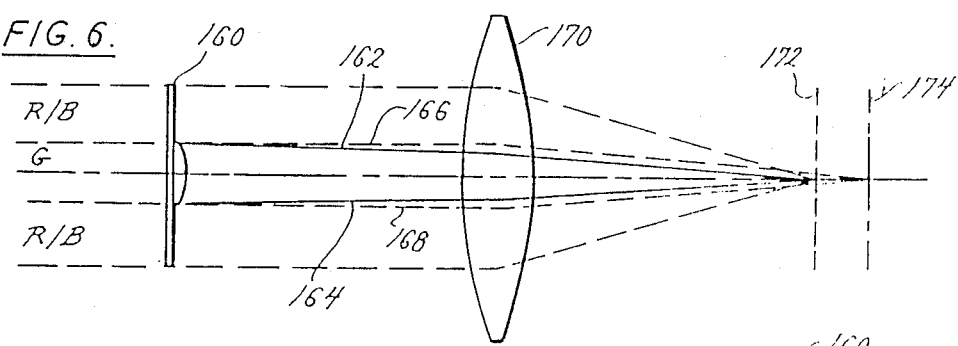
FIG. 6 is an illustration of the same system shown in FIG. 5 with the correction provided by the present invention utilizing a lens having positive power in the green pupil area.

Referring to FIG. 6, a system using a convex profile color corrector stripe lens 160 is illustrated. Here, the green spatially segregated light beams 162 and 164 converges (solid lines) compared to the uncorrected (dashed lines) beams 166 and 168. Without color corrector lens 160, light would pass through an imaging lens 170 with red/blue light focusing upon an image plane 172 with the green light focusing upon an image plane 174. The action of the color corrector lens 160 causes the light beams, once they pass through an imaging lens 170 to both focus upon image plane 172. Here, the convergence of the green light beam causes it to come to a focus sooner, as illustrated here, closer to the left.

Figure 7:
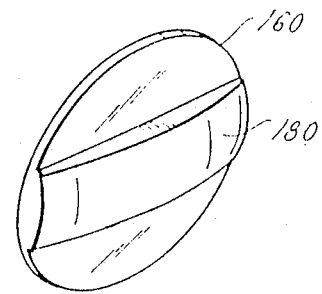
FIG. 7 is an isometric illustration of the lens utilized in FIG. 6.

Referring to FIG. 7, the color corrector lens 160 of FIG. 7, is isometrically illustrated. A view of the convex portion 180 is visible. The portion of color corrector lens 160 which is not occupied by convex portion 180, may be optionally curved, flat, or open to lend assistance to treatment of the red/blue portion of the segregated light beam as needed.

Figure 8:
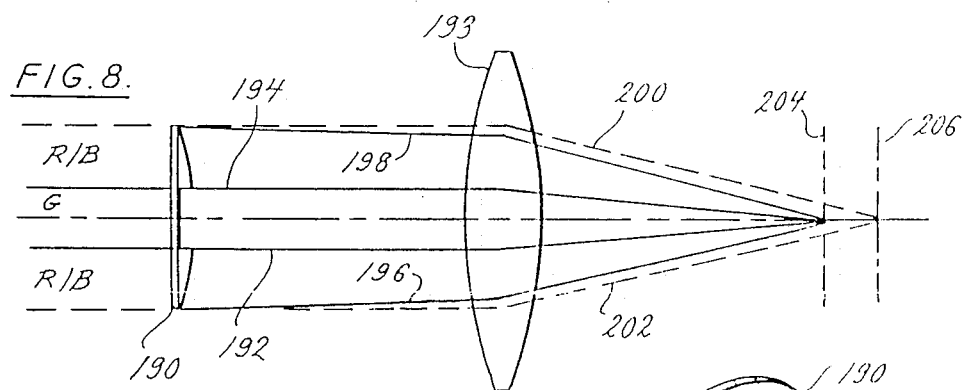
FIG. 8 is an illustration of the same system shown in FIG. 5 with the correction provided by the present invention utilizing a lens having positive power in the red/blue pupil area.

Referring to FIG. 8, a system using a color corrector lens 190 having slightly different geometry is illustrated. Here, the green spatially segregated light beams 192 and 194 are left unaltered. However, the red/blue spatially segregated light beams are corrected by refraction to converge somewhat rays, 196 and 198, compared to uncorrected rays 200 and 202. Without color corrector lens 190, light would pass through an imaging lens 193 with the green light focusing upon an image plane 204 and with the red/blue light focusing upon an image plane 206. The action of the color corrector lens 190 causes the light beams, once they pass through an imaging lens 193, to both focus upon image plane 204. Here the converging red/blue light beams causes the image to come to a focus closer to the left.

Figure 9:
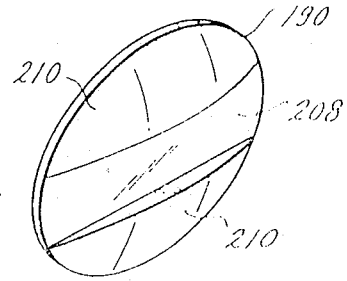
FIG. 9 is an isometric illustration of the lens utilized in FIG. 8.

Referring to FIG. 9, the color corrector lens 190 of FIG. 8 is isometrically illustrated. An isometric view of the flat portion 208 of the color corrector lens 190 is visible. A convex portion 210 surrounds flat portion 208. It is understood that the area occupied by flat portion 208 may be optionally curved, or flat, or remain open to lend assistance to treatment of the green portion of the segregated light beam as needed.

Figure 10:
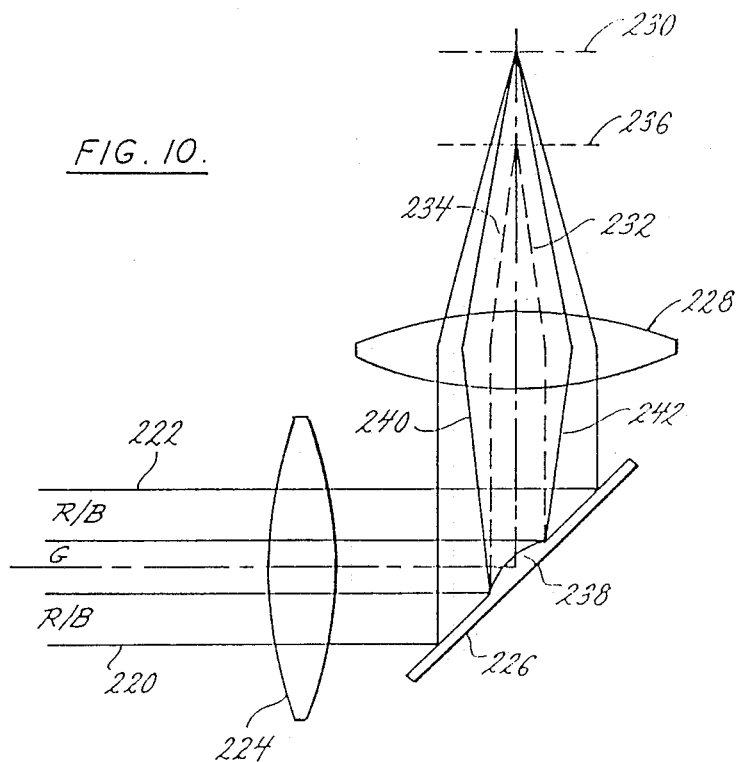
FIG. 10 is an enhanced illustration of an optical system containing a color correction lens that utilizes reflective power to adjust the focus of a respective color.

FIG. 10 illustrates a color correction lens that utilizes reflective power to adjust the focus of a respective color. in this example the red and blue light beams 220 and 222 are projected through a relay lens to a reflective mirror type surface on through a second relay lens 228 to a image plane 230. In the uncorrected condition the green light beams 232 and 234 are focused in the undesirable plane 236. In this embodiment a reflective surface 238 is matched to the green segment of the pupil surface in the manner previously discussed to adjust and shift the light beams 240 and 242 such that they are focused by the lens 228 into the image plane 230 with the red and blue colors. The reflective surface 238 may be configured by metallization or several other methods for creating reflective surfaces well known in the art.

Figure 11:
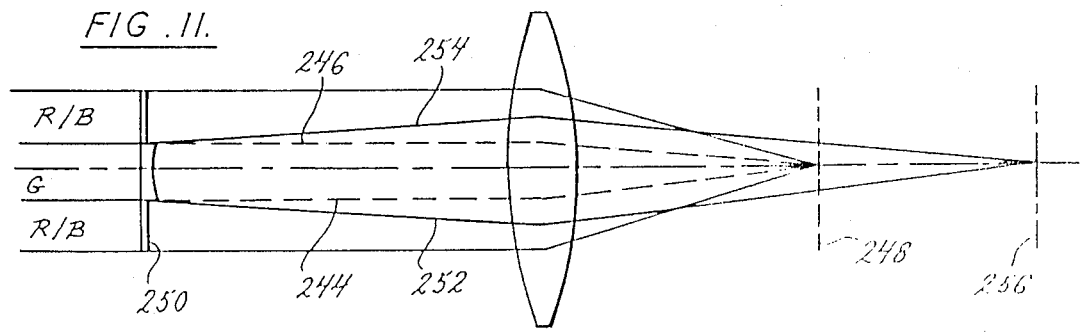
FIG. 11 is an enhanced illustration of how a color correction lens may be utilized in a perfectly matched optical system to separate colors into two image planes by applying negative refractive power.

In certain optical systems it may be desirable in a perfectly matched system to separate the colors into two image planes. In these systems very expensive dichroic beam splitters must be employed. The Principles of the present invention may also be applied to separate colors into two image planes. FIG. 11 illustrates a condition wherein the color correction lens 250 is used to shift the green light beams 244 and 246 from the common image plane 248 by applying negative refractive power to change beams 252 and 254 to a different plane 256.

Figure 12:
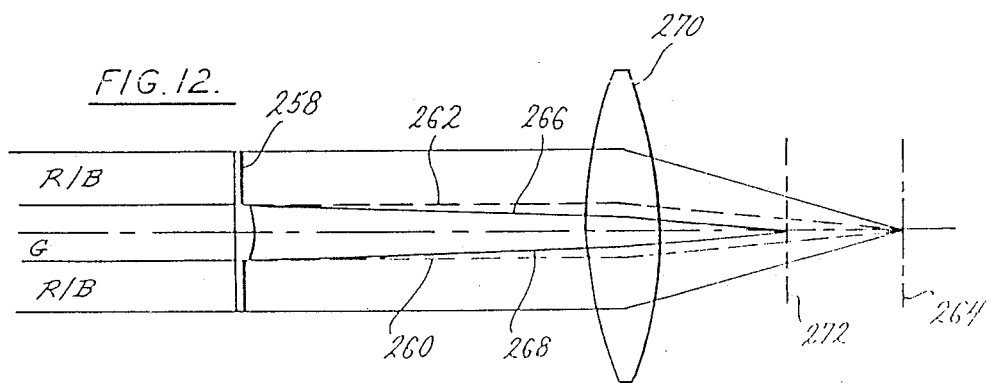
FIG. 12 is an enhanced illustration of how a color corrective lens may be utilized in a perfectly matched optical system to separate colors into two image planes by applying positive refractive power.

FIG. 12 illustrates the condition wherein positive refractive power is applied by lens 258 to shift the green light beams 260 and 262 from plane 264 into light beams 266 and 268 such that they are focused by lens 270 into the nearer image plane from the blue and red focused in plane 264.

Note that the reflective power discussed in FIG. 10 may also be applied in the dichroic manner illustrated by the refractive type lens of FIGS. 11 and 12.

As can be seen by the foregoing the color corrector lens illustrated provide a segment, sector or zone of lens or reflector having power, cut to match the shape of the separate color areas within the pupil of the light valve 118. Its purpose is to shift the focus of a specific wavelength, or color or group of select wavelengths, or multiple colors, such that all colors forming the final projected image come to a mutual focus at the final image location.

Focus is shifted by adjusting the slopes of rays of light of the specific wavelength(s) such that the following lens or lens group interpret these rays as coming from a shifted object position, thus effecting a shift in the final image location. The final projected image is not to be confused with the pupil image. Residual color focus error will still exist but will be greatly reduced.

The color corrector lens can be of negative or positive power, spherical or aspheric in curvature, refracting or reflecting in operation, of any segmented shape and not necessarily limited to the visible wavelengths. The focus shift of one color to that of the others in the final image plane is relatively slight. The color corrector lens would have spherical power in the order of but not limited to 20 to 100 waves and be shaped to match that of the color pupil area it is trying to refocus. A significant improvement in the resolution performance of this image when using multiple relay lenses is expected.

Color corrector lens can be used in any application where a color separate pupil image is formed, whether by a preceding source or located in the originating source projection system. The color corrector lens of the present invention can shift the focus of any separate color or colors in a pupil to match its focus plane with that of any other color or combination of colors to improve the definition of a projected, or otherwise viewed, image. With enough power, this lens of the present invention can shift the focus of any image of one color to an extreme such that two or more images of different colors can be formed along the optical axis. Also, with the additional use of optical wedges and/or reflectors, the invention can laterally displace images of different colors separating them for a variety of uses including 3-Dimensional applications.

Applications related to Flight Simulation include optical coupling to light valve projectors; head directed, high resolution, area of interest display for the full field of view domes; and background projection systems for the full field of view domes. Other applications within the simulation and the entertainment fields are many.

The foregoing disclosure and description of the invention are illustrative and explanatory thereof, and various changes in the mode of implementation of the lens and color imaging system, and variations thereon, types of lens and purposes of color correction as well as in the details of the illustrated embodiments may be made without departing from the spirit and scope of the invention.

What is claimed is:

1. An optical projection system comprising;
    (a) an pupil surface consisting of spatially separate color segments;
    (b) at least one projection means for receiving light from the pupil surface and directing the image to a projection plane; and
    (c) color correcting means placed at a selective pupil image of the optical projection system that contains the spatially separate color segments of the pupil surface for shifting the image plane of at least one of the spatially separate color segments such that all the spatially separate colors have a common focus in the projection plane.

2. The optical projection system in claim 1 wherein the pupil surface is a light valve.

3. The optical projection system in claim 1 wherein said projection means is comprised of a plurality of relaying projection lens for receiving the image of the pupil surface and transmitting the image to the projection plane.

4. The optical projection system in claim 1 wherein the color correction means is a lens configured to match at least one color segment of the spatially separated colors of the image such that the respective color can be refocused to a common focus in the projection plane.

5. The optical projection system in claim 4 wherein the color correction means is a lens configured to match at least one color segment of the spatially separated colors of the image such that color correction is obtained by applying microscopic amounts of selective power to the image at the selected aperture to cause a shift of the wavelength of at least one of the spatially separated colors to bring all the wavelengths to a common focus.

6. The optical projection system in claim 5 wherein the color correction means is a lens configured to match at least one color segment of the spatially separated colors of the image such that color correction is obtained by applying microscopic amounts of selective power to change the angle of refraction of the light beams such that the wavelength is shifted of at least one of the spatially separated colors to bring all the wavelengths to a common focus.

7. The optical projection system in claim 5 wherein the color correction means is a lens configured to match at least one color segment of the spatially separated colors of the image such that color correction is obtained by applying microscopic amounts of selective power to change the angle of reflection of the light beams such that the wavelength is shifted of at least one of the spatially separated colors to bring all the wavelengths to a common focus.

8. An optical projection system comprising;
(a) an pupil surface consisting of sPatially separate color segments;
(b) at least one projection means for receiving light from the pupil surface and directing the image to a projection plane; and
(c) color correcting means placed at a selective pupil image of the optical projection system that contains the spatially separate color segments of the pupil surface for shifting the image plane of at least one of the spatially separate color segments such that all the spatially separate colors have at least two image planes.

9. The optical projection system in claim 8 wherein the pupil surface is a light valve.

10. The optical projection system in claim 8 wherein said projection means is comprised of a plurality of relaying projection lens for receiving the image of the pupil surface and transmitting the image to the projection plane.

11. The optical projection system in claim 8 wherein the color correction means is a lens configured to match at least one color segment of the spatially separated colors of the image such that the respective color can be refocused to a different image plane.

12. The optical projection system in claim 11 wherein the color correction means is a lens configured to match at least one color segment of the spatially separated colors of the image such that color correction is obtained by applying microscopic amounts of selective power to the image at the selected aperture to cause a shift of the wavelength of at least one of the spatially separated colors to change the wavelength to a different image plane.

13. The optical projection system in claim 12 wherein the color correction means is a lens configured to match at least one color segment of the spatially separated colors of the image such that color correction is obtained by applying microscopic amounts of selective power to change the angle of refraction of the light beams such that the wavelength is shifted of at least one of the spatially separated colors to change the wavelength to a different image plane.

14. The optical projection system in claim 12 wherein the color correction means is a lens configured to match at least one color segment of the spatially separated colors of the image such that color correction is obtained by applying microscopic amounts of selective power to change the angle of reflection of the light beams such that the wavelength is shifted of at least one of the spatially separated colors to change the wavelength to a different image plane.

* * * * *